(No Model.) 4 Sheets—Sheet 3.
J. M. GETTEL, H. C. GRITTINGER & J. H. KILLINGER.
APPARATUS FOR CHARGING BLAST FURNACES.
No. 350,534. Patented Oct. 12, 1886.
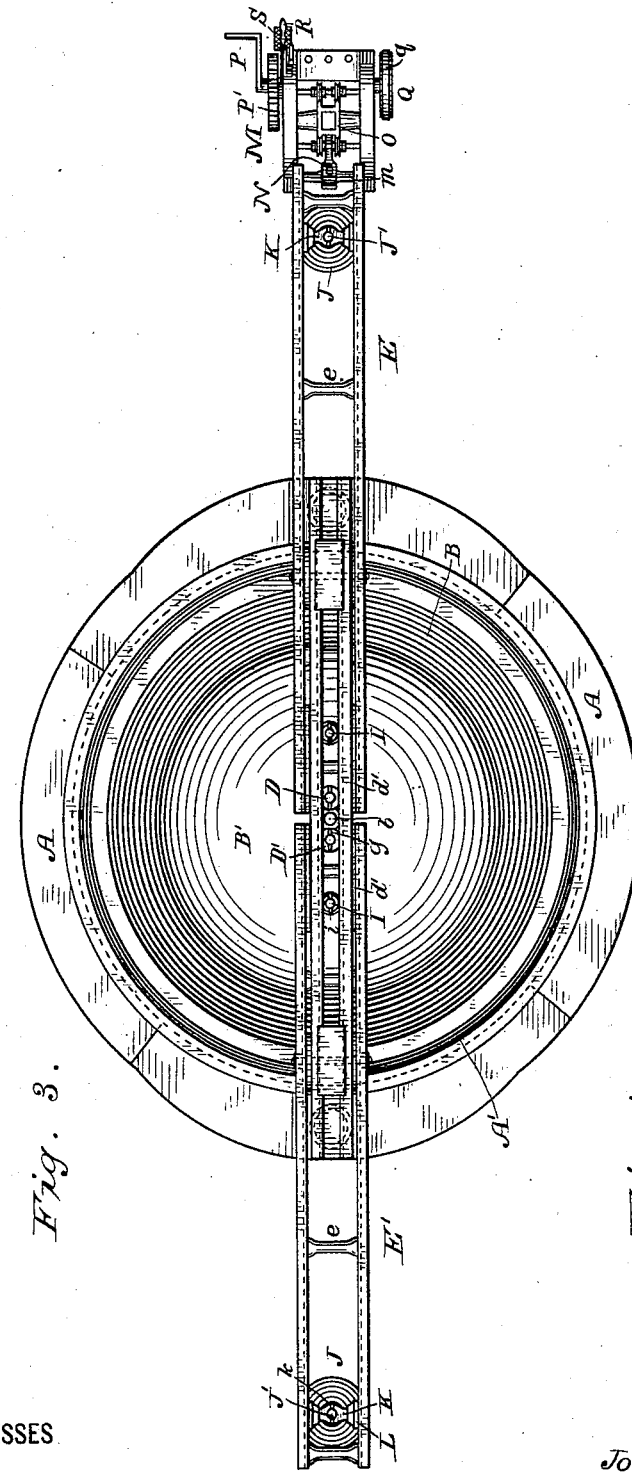
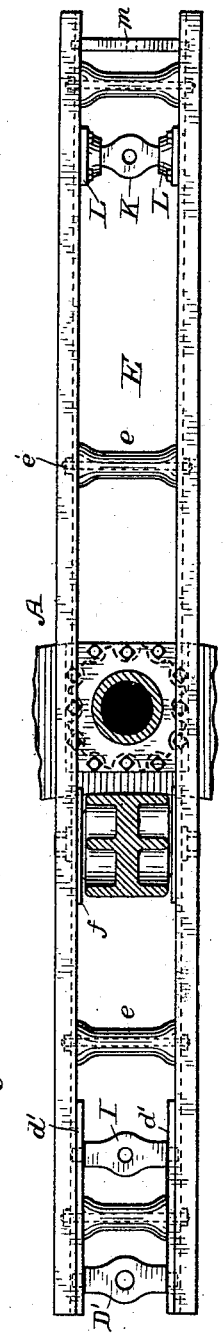
WITNESSES
Ed. A. Newman
Al. C. Newman
INVENTOR
Josiah M. Gettel,
Henry C. Grittinger,
John H. Killinger.
By their Attorneys

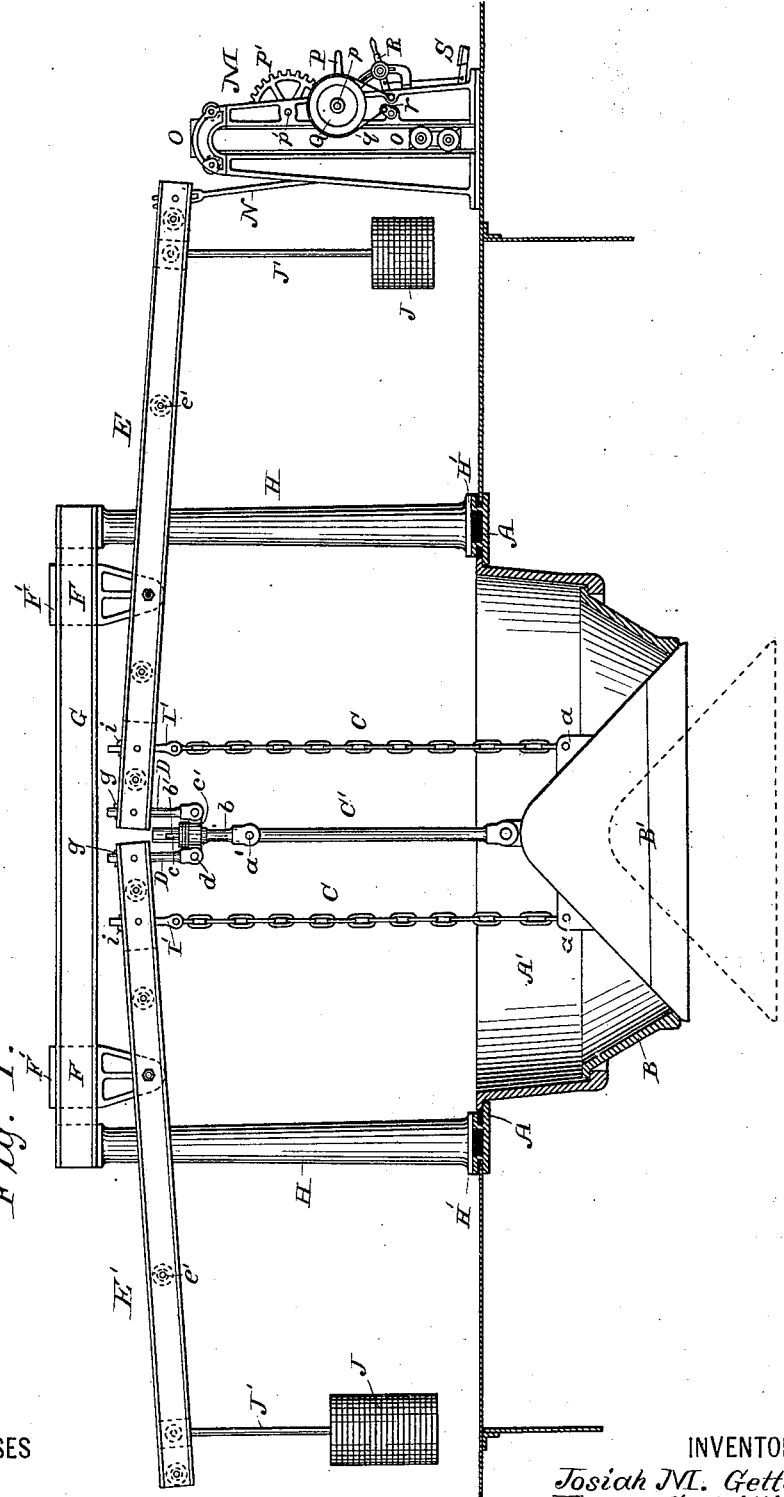

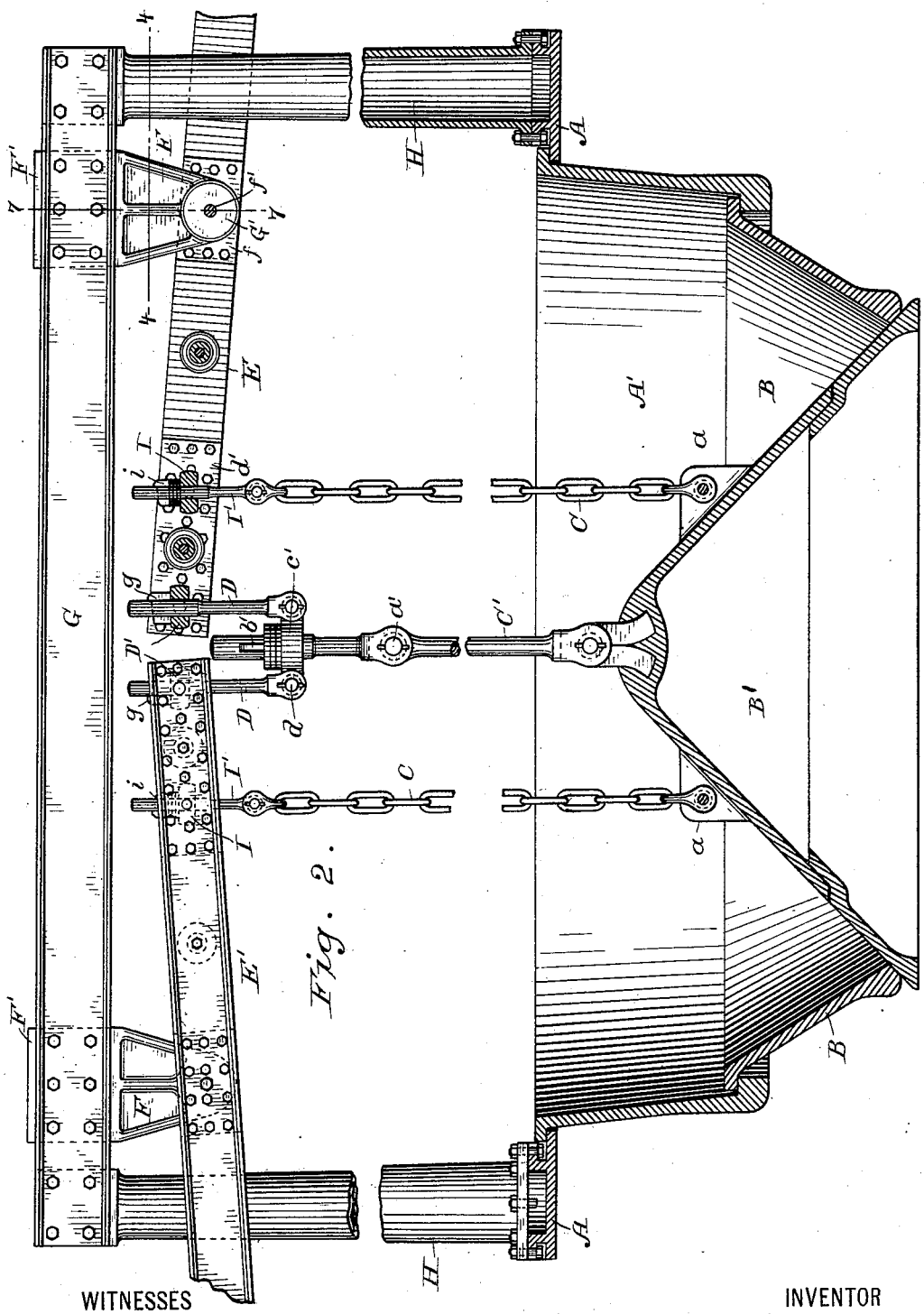

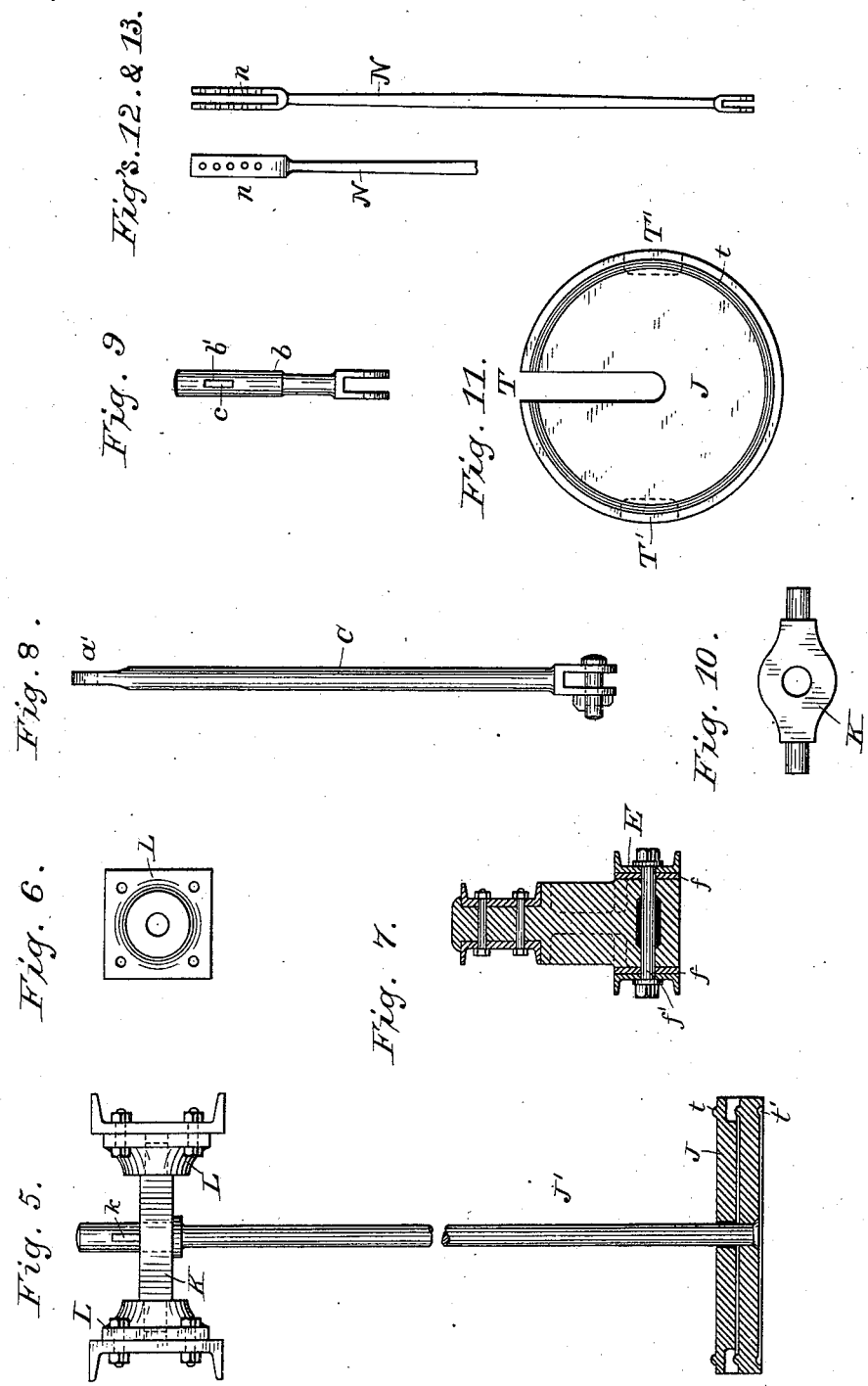

UNITED STATES PATENT OFFICE.

JOSIAH M. GETTEL, OF LEBANON, HENRY C. GRITTINGER, OF CORNWALL, AND JOHN H. KILLINGER, OF LEBANON, PENNSYLVANIA; SAID GRITTINGER AND KILLINGER ASSIGNORS TO SAID GETTEL.

APPARATUS FOR CHARGING BLAST-FURNACES.

SPECIFICATION forming part of Letters Patent No. 350,534, dated October 12, 1886.

Application filed May 7, 1886. Serial No. 201,470. (No model.)

*To all whom it may concern:*

Be it known that we, JOSIAH M. GETTEL, of Lebanon, HENRY C. GRITTINGER, of Cornwall, and JOHN H. KILLINGER, of Lebanon, all in the county of Lebanon and State of Pennsylvania, have invented certain new and useful Improvements in Apparatus for Charging Blast-Furnaces, of which the following is a specification.

Our invention relates to improvements in furnaces of the class in which charging-hoppers are provided with suspended hollow cone-like movable bottoms or charging-bells; and our object, chiefly, is to provide for readily and easily controlling the working of the charging-bells and to cause them to be raised and lowered in direct vertical paths in the centers of the furnaces.

The subject-matter deemed novel will be specifically designated by the claims, after first describing our invention by the aid of the accompanying drawings, in which are shown only those features illustration of which is required to convey a proper understanding of our improvements.

Figure 1 is an elevation showing the apparatus in position, a portion of the top of the furnace-shell being represented. Fig. 2 is a view, on an enlarged scale, partly in elevation and partly in vertical central section, with the bell-supporting levers and other parts broken away and the furnace and other features omitted. Fig. 3 is a plan view with the furnace omitted. Fig. 4 is a plan view of the controlling-lever of the pair of bell-supporting levers, with other parts in section on the line 4 of Fig. 2. Figs. 5 to 13, inclusive, show various details. Of these views Fig. 5 shows the manner of suspending the counterbalance-weights of one of the levers for supporting the charging-bell, and Fig. 6 shows one of the bearing-plates for the cross-head pivot for the weight-carrying rod. Fig. 7 is a section on the line 7 of Fig. 2, showing the pendent fulcrum-bracket for one of the levers and the manner of connecting it with the cross-beam and lever. Figs. 8 and 9 show the two sections of the jointed suspending-rod for the bell. Fig. 10 shows one of the cross-head pivots. Fig. 11 is a plan of one of the counterbalance-weights. Figs. 12 and 13 show the rod for connecting the controlling-lever with the cross-head slide of the winch.

The top opening or charging-mouth of an ordinarily-constructed blast-furnace is provided with the annular plate or "seat-ring" A and the sectional charging-hopper composed of the upper part, A', and the flaring lower part or "lip-ring" B. These parts are of usual well-known construction, and detailed description of them is not here needed.

The charging cone or bell B' is of cast-iron and made in two sections—an upper and a lower part—bolted together. The lower section is provided with the inner flange at top, against which the bottom of the upper section is seated, as plainly shown, and detachably secured by bolts in obvious way. The upper section of the charging-bell is provided at its sides and near its apex with four perforated lugs, $a$, arranged in pairs diametrically opposite each other. By way of these lugs the bell may be suspended from suitable apparatus to place it in position and remove it, and they serve to connect the bell with suspending safety-chains C C, pivotally attached at their lower ends to them.

By making the bell in detachably-connected sections the lower portion, which is liable to burn or wear out, can be renewed without discarding the upper section.

A bell-suspending rod has jointed connection at its lower end with the bell, as usual, and is preferably made in two sections, C' b, jointed together at $a'$. The upper end of the suspending-rod has an elongated opening, $b'$, through it to receive a cross-pin, $c$, above a suspended cross-head, $c'$, through a central opening in which the suspending-rod passes. Any desired number of washers may be interposed between the cross-pin and upper surface of the suspended cross-head for an obvious purpose. This cross-head has jointed suspending connection with the adjacent inner ends of two supporting-levers, E E', by way of two link-rods, D D, and the safety suspending-chains C C are also connected at their upper ends with these levers, as farther on to be described. One of the pair of supporting-levers (the lever E) is operated by connection with a suitable winch, and may appropriately be designated the "controlling-lever" of the pair, as it is so connected with the other supporting-lever, E', as to control its movements, as will farther on be made apparent.

Each of the supporting-levers is composed of two side beams of channel-iron separated from each other and securely braced together by a suitable number of tubular spacing-bars, $e$, through which and the beams pass screw-bolts $e'$, provided with securing-nuts, as will readily be understood. The levers are pivoted to pendent fulcrum-brackets F F, secured to an overhead cross-beam, G, supported at its opposite ends upon posts H H, bolted by their flanged bases H' H' to the seat-ring A. These posts are hollow and pass up through the supporting-levers between their side beams.

The cross-beam G is composed of two channel-beams suitably bolted together and to the tops of the posts, and having the fulcrum-brackets securely bolted between the channel-beams. These brackets have side flanges, F' F', at top to rest upon the channel-beams.

To give increased strength to the supporting-levers at their fulcrums, side plates, $f f$, are bolted to the sides of the channel-beams of these levers, and the fulcrum-pivots $f' f'$, consisting of threaded bolts provided with nuts, pass through the lower ends of the fulcrum-brackets and through these side plates and the angle-beams of the levers. The fulcrum-brackets are of cast-iron, with suitable strengthening-ribs, as plainly shown, and terminate at their lower ends in pivot-receiving bosses G', between the beams of the levers. Diametrically-opposite lugs of the cross-head $c'$ are jointed by pivot-pins $d\ d$ in the forked lower ends of the link-rods D D, and these link-rods at their upper ends pass through central openings in cross-head pivots D' D', journaled at their ends in the channel-beams of the supporting-levers and their strengthening side plates, $d'\ d'$. Cross-pins or wedge-keys $g\ g$ pass through the suspending link-rods above their cross-head pivots to support the weight of the parts suspended from these link-rods. The safety suspending-chains are connected at their upper ends with the supporting-levers by the cross-head pivots I I by means of the link-rods I' I', provided with the cross-pins $i\ i$. Counterbalance-weights J J are suspended from the ends of the supporting-levers by the rods J' J', connected with the cross-head pivots K K, through which they pass and are held by cross-pins $k\ k$. These cross-head pivots and the similar pivots, D' D' and I I, allow the counterbalance-weights, the suspending-rod C' $b$, and the safety suspending-chains C C to hang vertically or directly downward at all times. It will be seen that the manner of suspending the bell and staying it by the chains prevents swaying or tipping, such as occurs when a single supporting-lever is employed to operate the bell connected with it by a suspending-rod only. The cross-head pivots K, for the weighted rods J', are shown as journaled in bossed bearing-plates L L, secured to the sides of the angle-beams composing the supporting-levers. Similar bossed bearing-plates may be provided for the other cross-head pivots.

The winch M may be of any appropriate well-known construction suitably connected with the controlling supporting-lever E. As shown, the connecting-rod N is adjustably connected at its upper end with the cross-head pivot $m$ of the lever. At its lower end the connecting-rod is suitably pivoted to a slide, O, properly guided in its reciprocations in the frame of the winch. The connecting-rod is adjustably jointed to the lever by means of its forked end $n$, embracing the cross-head pivot $m$, and provided with a series of holes for engaging it by a pin with the cross-head pivot through which the pin is passed, and detachably secured in obvious way. The details of the winch are not shown, as the winch *per se* is elsewhere claimed by us. The winch-crank P serves to rotate the shaft $p$, and by means of a pinion on this shaft motion is imparted to the gear P', the shaft $p'$ of which is adapted to actuate the slide O by means of a pinion and rack. A brake-wheel, Q, on the shaft $p$ is embraced by a brake-strap, $q$, one end of which is made fast to the winch-frame, and the other end attached to a crank, $r$, of a rock-shaft to which the inner end of the brake-lever R is attached. Suitable clamping or detent devices for temporarily holding the lever in the desired position are provided, and a foot-treadle, S, is also provided and connected with the lever in order that it may be controlled by the foot of the attendant. The outer ends of the supporting-levers are each weighted to an extent somewhat more than is required to counterbalance one-half of the weight of the charging-bell when unloaded. The counterbalance-weight J for the lever E' is shown as greater than that for the controlling-lever E, the weight J for the latter, to enable it to overcome its half of the weight of the bell, being assisted by the weight of its winch-connections and the friction of the parts set in motion during the movement of this lever. The counterbalance-weights are, for obvious purpose, made up of disks provided with slots T, the hand-holds T', and the annular ridges $t$ and grooves $t'$ at their opposite sides.

In operation, when the bell is loaded it is lowered (see dotted lines Fig. 1) by actuating the winch in obvious way, and after discharging its load is restored quickly and truly to its seat, the weighted supporting-levers, and the manner in which they are connected with each other and with the bell insuring its movement in a strictly vertical direction. When the bell has been raised to its seat against and within the hopper-lip ring and the brake put on and the brake-lever clamped, the bell is ready for another charge.

It will be seen that in accordance with our invention two supporting-levers are necessary, and that it is essential to have three suspending connections between the charging-bell and these levers for properly raising and lowering the bell and steadying it, one of these connections—the central one—being between the apex of the bell and both levers, and the other connections being made independently between the respective levers and the bell at opposite sides of its apex. These requisite features of our invention distinguish it from apparatus of this class heretofore devised, in one form of which there is employed a single supporting-lever having a single suspending connection with the apex of the charging-bell, which at its opposite sides has connection by means of rods with a rigid supporting-arch or overhanging frame through which the rods slide, and by which they are limited in their downward movement, the functions of these rods being to yieldingly check and limit the downward movement of the bell.

We claim as of our own invention—

1. The combination of the charging-hopper, the charging-bell, the two supporting-levers, the suspending-chains, the suspending-rod, and its cross-head, having jointed suspending connection with the supporting-levers, substantially as and for the purpose set forth.

2. The combination of the charging-hopper, the charging-bell, the suspending-rod, its cross-head, the link-rods pivoted thereto, the supporting-levers, the cross-head pivots thereof for the link-rods, the suspending-chains at opposite sides of the suspending-rod connected at their lower ends with the charging-bell, the link-rods to which the upper ends of the chains are connected, and the cross-head pivots by which the chains are connected with the supporting-levers, substantially as and for the purpose set forth.

3. The combination of the pair of supporting-levers, their counterbalance-weights, the winch by connection with which the controlling-lever of the pair of supporting-levers is actuated, the charging-hopper, the charging-bell, the suspending-rod, its cross-head having jointed suspending connection with the supporting-levers, and the suspending-chains at opposite sides of the suspending-rod, and having connection at their opposite ends with the supporting-levers and the charging-bell, substantially as and for the purpose set forth.

4. The combination of the supporting-levers, each composed of side beams separated from each other and braced together, the cross-beam above the supporting-levers, its supporting-posts passing up between the side beams of the supporting-levers, the seat-ring to which the posts are secured at their bases, and the fulcrum-brackets for the supporting-levers secured to the cross-beam and projecting at their lower ends between the side beams of the supporting-levers, substantially as and for the purpose set forth.

In testimony whereof we have hereunto subscribed our names.

JOSIAH M. GETTEL.
HENRY C. GRITTINGER.
JOHN H. KILLINGER.

Witnesses:
JOHN HUNSICKER,
E. W. STONER.